United States Patent [19]

DaCosta

[11] 4,206,862
[45] Jun. 10, 1980

[54] WELDING FILLER WIRE FEED APPARATUS

[75] Inventor: Dominick P. DaCosta, Columbus, Ohio

[73] Assignee: Pennwalt Corporation, Philadelphia, Pa.

[21] Appl. No.: 848,963

[22] Filed: Nov. 7, 1977

[51] Int. Cl.² .............................................. B65H 17/08
[52] U.S. Cl. ............................. 226/178; 219/137.71; 219/137.2; 226/196; 228/41
[58] Field of Search ............... 219/136, 137.2, 137.31, 219/137.7, 137.71, 132; 226/178, 174, 196; 228/249, 23, 33, 41, 45, 134

[56] References Cited
U.S. PATENT DOCUMENTS

| | | | |
|---|---|---|---|
| 2,806,125 | 9/1957 | Miller | 219/137.31 |
| 3,162,750 | 12/1964 | Anderson | 219/137.7 |
| 3,239,120 | 3/1966 | Bosteels | 219/137.7 |
| 3,248,516 | 4/1966 | Gilliland | 219/137.71 |
| 3,428,778 | 2/1969 | Blackman et al. | 219/137.31 |
| 3,469,070 | 9/1969 | Bernard et al. | 219/137.31 |
| 3,652,823 | 3/1972 | Clemens et al. | 219/137.7 |
| 3,734,369 | 5/1973 | Johnson | 226/134 |

*Primary Examiner*—B. A. Reynolds
*Assistant Examiner*—Clifford C. Shaw
*Attorney, Agent, or Firm*—Charles N. Quinn

[57] ABSTRACT

Welding filler wire feed apparatus includes a handpiece, means for advancing filler wire through the handpiece in response to a signal produced by a finger pressure-sensitive switch on the handpiece, and a flexible conduit, connecting the handpiece to filler wire advancement means, for passage of filler wire therethrough. Rate of wire advancement through the handpiece is adjustable.

1 Claim, 4 Drawing Figures

WELDING FILLER WIRE FEED APPARATUS

BACKGROUND OF THE INVENTION

1. Field of the Invention

This invention relates to apparatus which facilitates Tungsten Inert Gas (TIG) welding but which is neither electrically nor mechanically connected to the TIG welding torch.

2. Description of the Prior Art

Welding filler wire feeder systems are known, operating to feed "hot" or "cold" welding filler wire to the weld puddle at the workpiece. (A "hot" welding filler wire is one which carries a current and serves as a consumable electrode. In hot wire systems, the welding arc is struck between the workpiece and the consumable electrode with a high voltage potential difference existing between the workpiece and the consumable electrode. Many hot wire welding processes are of the Gas Metal Arc type, commonly abbreviated as MIG; this MIG designation as used hereinafter encompasses all hot wire welding processes. A "cold" welding filler wire is one which carries no current and which, though consumed, does not act as an electrode from which a welding arc is struck. In cold wire systems, the welding arc is struck between the workpiece and a nonconsumable permanent electrode. The cold welding filler wire is fed into the neighborhood of the arc, where a weld puddle is created. Many cold wire processes are of the Tungsten-Inert Gas type, commonly abbreviated as TIG; this TIG designation as used hereinafter encompasses all cold wire welding processes.) In both MIG systems and TIG systems an inert gas is supplied at the workpiece to insulate the weld puddle from ambient atmosphere thereby avoiding oxidation and contamination of the finished weld. Various welding filler wire feed systems are shown in U.S. Pat. Nos. 2,681,970; 2,880,305; 3,619,553; 3,652,823; and 3,808,397. The '970 patent relates to both MIG and TIG welding and it discloses both hot and cold welding filler wires. '970 illustrates feed of both hot and cold filler wires to the workpiece, at a constant speed, via a bulky nozzle through which the insulative welding gas also passes. There is no provision for varying feed speed or for starting and stopping welding wire feed at the nozzle, i.e. a fully automatic welding system is disclosed. The '305 patent relates to MIG welding and discloses a handpiece having both welding filler wire advancement wheels and a shielding gas outlet nozzle therein; this makes the handpiece bulky. The thrust of '305 is towards providing a bearing assembly which allows orderly unreeling of a welding filler wire from a stationary roll having its axis vertically oriented. The '553 patent relates to MIG welding and broadly discloses a handpiece through which hot welding wire is fed by a pair of drive wheels which advance the hot wire off a reel oriented with a vertical axis of rotation. There is no suggestion of any means for controlling off-on operation or rate of feed or the hot wire. The '823 patent discloses welding filler wire guide nozzles, which can handle either hot or cold filler wire, and is directed towards providing means for quick changeover among different sizes of welding wire and among welding wires of different materials. '823 uses a plurality of nozzles, each equipped with a different size or type of welding wire, to facilitate quick changeover. A common drive shaft is provided, with a plurality of separate feed rollers thereon, one roller for each of the wires to be fed. Feed is effected by shifting a counterroller into engagement over the selected wire and its associated feed roller. When this is done, the other wires remain loose on their rollers without pressure; those wires are not fed. The '823 patent shows drive and idler rollers used to advance welding filler wire and features nozzles removably received in clamps to maintain a selected angle between the wire feed nozzle and the position where the welding torch creates the weld puddle. '823 fails to disclose any means for controlling off-on operation or rate of feed of welding wire at a feed nozzle remote from the wire reel. The '397 patent discloses a control device to regulate welding current and voltage. The control device also allows welding rod to feed therethrough, but there is no indication of power feed for the flexible welding rod. The rod is gravity fed; this limits the applicability of '397 to heavy welding rod stock.

U.S. Pat. No. 3,248,525 discloses a welding wire fed from a spool, by drive rollers through a flexible conduit to a remote welding torch, with the torch-conduit connection made through a rotary coupling. '515 is directed primarily towards the conduit and the rotary coupling and does not disclose any means for varying wire feed speed or for starting and stopping wire feed.

These prior art devices tend to be heavy and cumbersome and do not facilitate regulation of welding filler wire feed rate at the work site. When a change in the characteristics of the workpiece being welded requires a change in the feed rate of the filler wire, the prior art devices necessitate shutdown of the welding system to be adjusted. Loss of welding efficiency results. Moreover, the cumbersome nature of the prior art devices does not allow a worker to easily weld in tight quarters or in awkward positions, e.g. lying flat on his back looking upward at the workpiece requiring welding. Additionally, previously known TIG devices are subject to frequent periods of downtime when the operator exhausts his supply of filler wire at the work site.

SUMMARY OF THE INVENTION

This invention facilitates efficient welding by providing an easily-manipulated welding filler wire feed apparatus which includes a lightweight highly manipulable miniature handpiece, means for advancing filler wire through the handpiece in response to a signal produced by a finger pressure-sensitive switch on the handpiece, and a flexible conduit, connecting the handpiece to the filler wire for passage of filler wire therethrough. The speed of filler wire advancement through the handpiece is adjustable. By feeding the filler wire off a large roll thereof, the problem of welding system downtime at the job site is, for all practical purposes, eliminated.

DESCRIPTION OF THE PREFERRED EMBODIMENTS

Figure 1:
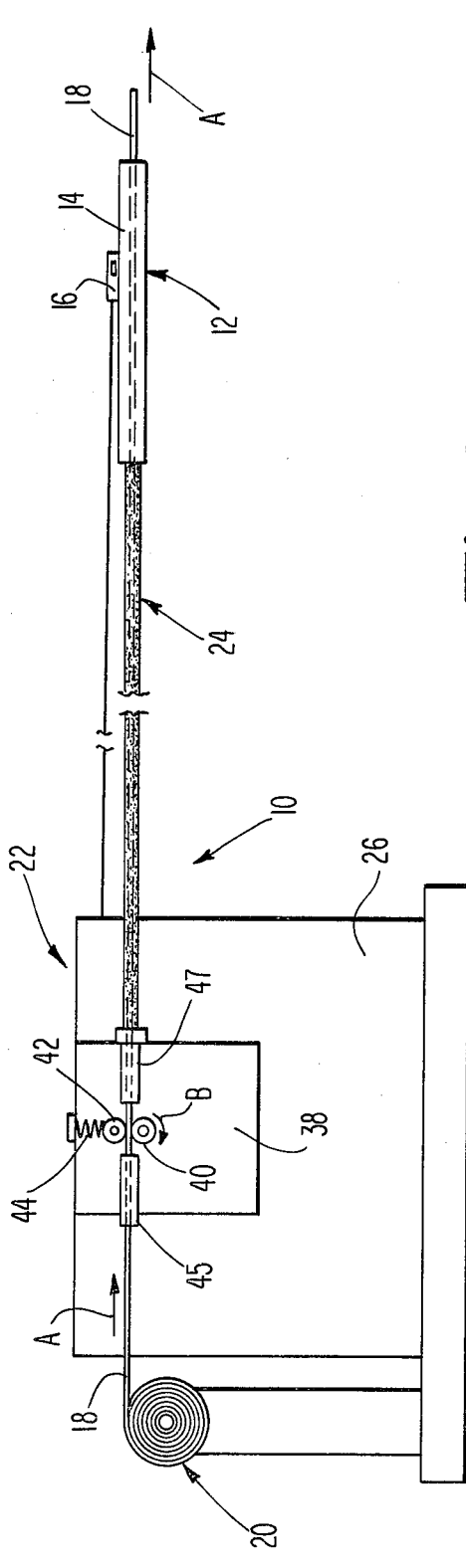
FIG. 1 is a side elevation schematic view of welding filler wire feed apparatus embodying the invention.

In FIG. 1 the welding filler wire feed apparatus is designated generally 10 and includes a handpiece designated generally 12, a flexible conduit 24 for passage therethrough of welding filler wire, and means designated generally 22 for unwinding filler wire from a wire reel and advancing filler wire through the handpiece. Handpiece 12 includes a generally elongated outer liner portion 14 having an axially extending filler wire passageway therethrough and switch means 16, secured to outer liner 12, for activating filler wire advancement means 22 to advance filler wire through the liner. The welding filler wire is designated 18 and is unwound off rotatable filler wire reel 20 by means 22.

Unwinding means 22 includes a frame 26 removably mounted on a base 27, a motor designated generally 38, mounted on frame 26 and which rotates a wire drive roller 40 to advance wire 18 in a direction shown by arrow A as drive roller 40 rotates in the direction shown by arrow B. Frame 26 is removable from base 27 and can be carried about, by means of a shoulder strap, by an operator. Rotatable filler wire reel 20 is mounted rotatably on base 27. Filler wire 18 is tensioned against drive roller 40 by idler roller 42 which is biased by tensioning spring 44. Wire alignment tubes 45 and 47, secured to frame means 26, assure that as wire 18 is advanced in the direction shown by arrow A, it is maintained substantially horizontal as it contacts drive roller 40. This assures proper contact of wire 18 with drive roller 40. Rotatable filler wire reel 20 is rotatably mounted on base 27, while wire alignment tubes 45 and 47 are mounted on frame 26. Drive roller 40 is unitarily mounted on the output shaft of motor 38, with motor 38 being mounted on frame 26. Idler roller 42 and tensioning spring 44 are also both mounted on frame 26, with idler roller 42 being movably mounted, to bias wire 18 against drive roller 40 in response to force exerted thereon by tensioning spring 44.

Figure 2:
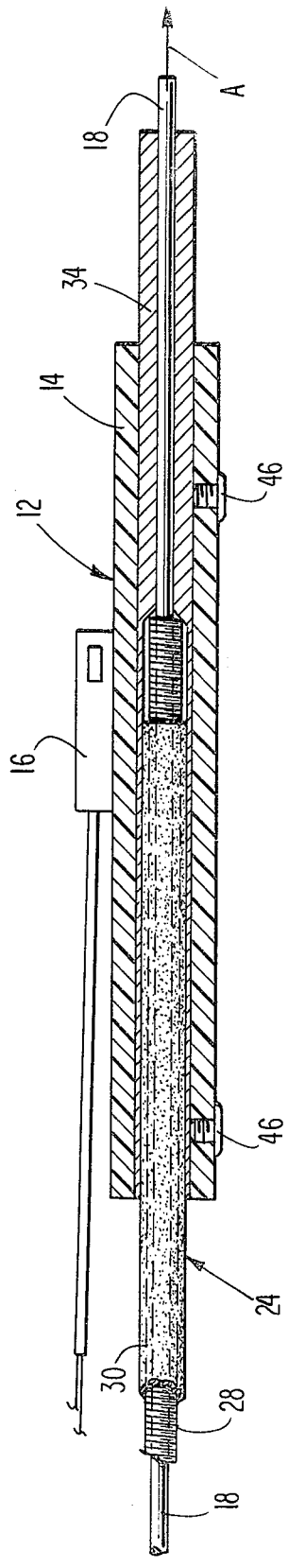
FIG. 2 is a side sectional view of a first embodiment of the handpiece of the invention.

Referring to FIG. 2, handpiece 12 includes generally elongated portion 14 which has a filler wire passageway therethrough, switch means 16, secured to elongated portion 14, for triggering advancement of filler wire 18 from reel 20 through handpiece 12, and a hollow filler wire guide tube 34 extending from liner portion 14, to guide filler wire 18 as the filler wire exits the handpiece. Flexible conduit 24 connects the handpiece to unwinding means 22 and includes an inner helical liner 28, formed of flexible helically coiled material, preferably metal, through which filler wire 18 slidably passes, and a protective outer sheath 30, formed of a flexible electrically insulative substantially impermeable material such as rubber, to keep dirt and moisture away from filler wire 18. Wire feed guide tube 34 and flexible conduit 24 are preferably maintained within elongated liner 14 by set screws 46; adhesives may also be used. Switch 16 may be secured to liner portion 14 by adhesives.

Figure 3:
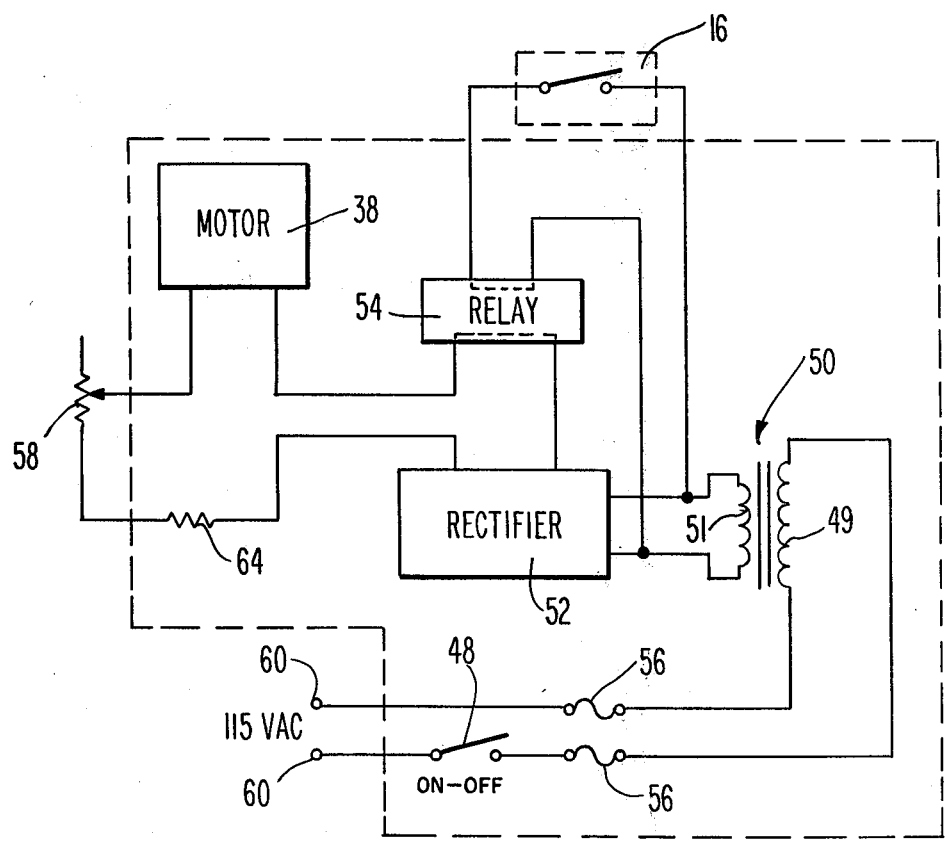
FIG. 3 is a schematic view of the electrical circuitry of the invention.

Referring to FIG. 3, dotted line C enclosing certain of the circuit elements denotes those elements which are positioned on means 22 for unwinding filler wire from wire reel 20. 115 volt 60 cycle alternating current is supplied via terminal 60 through on-off switch 48 and fuses 56 to the primary windings 49 of transformer 50. This voltage is stepped down by transformer 50 and input to rectifier 52. Additionally, voltage is taken off secondary windings 51 of transformer 50 for input to relay 54 so relay 54 may be controlled by switch 16 located on the handpiece. Direct current is output from rectifier 52, through resistor 64, variable potentiometer 58 and through switched output terminals of relay 54, to motor 38.

When the wire feed apparatus of the invention is energized and an operator desires to advance filler wire 18, he applies finger pressure to switch 16. This energizes the input terminals of relay 54, which closes the output terminals of relay 54 thereby completing the circuit which includes motor 38 thereby allowing direct current, coming from the output terminals of rectifier 52, to flow to motor 38, rotating wheel 40 and thereby advancing filler wire 18 from reel 20. As drive wheel 40 rotates and longitudinally advances wire 18, due to wire 18 being biased against drive wheel 40 by idler wheel 42 being urged downwardly, against drive wheel 40, by spring 44, wire 18 is unwound from reel 20 and is advanced through flexible conduit 24 and handpiece 12 seriatim. By varying the setting of variable potentiometer 58, the operator can adjust rate of advancement of filler wire 18 by controlling speed of motor 38.

Figure 4:
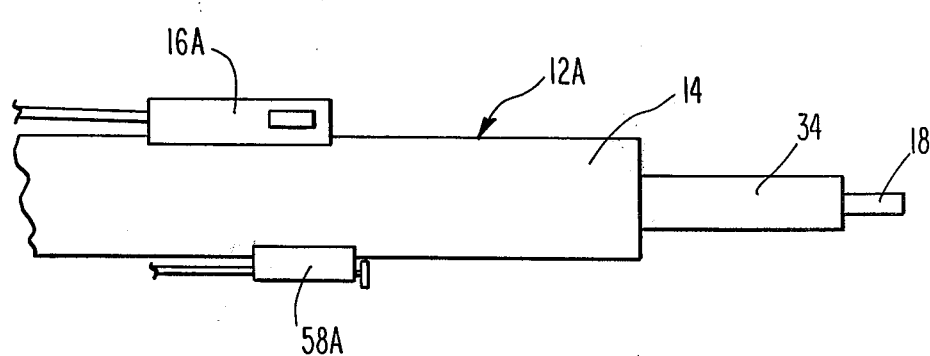
FIG. 4 is a broken side view of a second embodiment of the handpiece of the invention.

Referring now to FIG. 4, an alternative embodiment of the handpiece, designated generally 12A, includes not only switch means 16A for triggering filler wire advancement through liner 14 but also has variable potentiometer 58A mounted on the handpiece for remote adjustment of wire advancement speed by the welding operator.

The wire advancement means may also be fabricated with a combination off-on variable potentiometer-type switch, serving the function of both switch 16 and variable potentiometer 58, mounted on the handpiece. In such case, the operator, by initially depressing the switch, begins advancement of the filler wire. As the switch is further depressed, wire advancement speed increases, but as finger pressure is lessened, the speed of wire advancement decreases and wire advancement halts when the operator removes his finger from the switch. In such embodiment, the switch-relay portion of the circuit shown in FIG. 3 is not utilized; the relay is eliminated with one of the motor inputs then being directly connected to the rectifier output.

The embodiment of the invention illustrated in FIG. 1 has been assembled using a 25.2 volt 2 amp secondary/117–125 volt primary 1500 volt reverse voltage maximum surge transformer, a 22 ohm 50–25 watt variable resistor, a 45 volt 5 amp selenium rectifier and a 2–28 volt relay, all of which are commercially available. The handpiece has an outer diameter, measured about the elongated outer liner, of about ⅜ inch; this should be contrasted to 3 inches which is the smallest outer diameter of prior feeder handpieces. As fabricated, the handpiece weighs about 5 ounces; this should be contrasted to 24 ounces which is the lightest weight of prior feeder handpieces.

When the invention has been introduced to experienced welders, no additional training of the welders has been required; the welders have been able to adapt their welding techniques almost instantaneously from use of a hand-held rigid welding filler rod to use of a flexible welding filler wire in combination with the feeder invention. (The welders had previously been forced to use hand-held rigid welding filler rods due to (1) the confined spaces in which the welders are required to work and (2) the exceedingly intricate welds the welders are required to perform while working in the confined spaces.) Indeed, use of the invention has increased welder efficiency. Welders previously depositing from 4 to 6 inches of TIG linear weld per minute have found that they deposit from 8 to 12 inches of TIG linear weld per minute using the feeder invention. Moreover welders previously depositing from 6 to 8 inches of plasma linear weld per minute have found that they deposit from 10 to 14 inches of plasma linear weld per minute using the feeder invention. With both types of welding, weld quality improved when the feeder invention was used because higher weld deposition rates allowed faster arc travel times, with less thermal distortion of the workpiece resulting. Also, the feeder invention allows the welder to keep his "feed hand" further from the arc thus reducing risk of injury while welding.

Use of the feeder invention has also resulted in substantial cost savings over use of hand-held rigid welding filler rods. Straight lengths of flagged welding filler wire cost 40 percent more than spooled welding filler wire of the type fed by the invention. Safety code requirements specify that each welder be issued only enough straight flagged welding rod for his work shift. This constraint is not extant when the feeder invention is used since a reel of welding filler wire can remain in the feeder, close to the work station; safety codes do not require than the worker check the welding filler wire reel and the feeder invention out and in, from a safety code-specified area, when beginning and ending his work shift. Furthermore, when the feeder invention is used, weld deposition rate is controlled entirely by wire feed rate; feed stock diameter is not a factor (affecting weld deposition rate) as it is when hand-held rigid welding filler rod is used. Heretofore, rigid welding filler rods had to be purchased in four different diameters, to accomodate all deposition rates, when hand-held rigid welding filler rods and associated welding techniques were used. Yet another advantage is that there is no waste of welding filler material with the filler wire feeder invention. When rigid welding filler rods are used and are hand-held, there is necessarily some waste since as the rod gets shorter, the welder must bring his hand closer to the arc. There is a minimum distance the individual welder can tolerate between the arc and his hand. When a rigid hand-held welding filler rod has been reduced to that distance, it must be discarded with consequent waste of the discarded portion.

Although the above description has concentrated on use of the feeder invention in TIG welding, the feeder invention has also proved to be exceedingly valuable in brazing (silver soldering) operations, by effectively eliminating waste of expensive silver alloy brazing material.

Variations and combinations, including reversals of parts from those shown, and other modifications fail within the scope of this invention. The above particular description is by way of illustration and not of limitation. Changes, omissions, additions, substitutions, and/or modifications may be made without departing from the spirit of the invention.

I claim the following:

1. Welding cold filler wire feed apparatus for feeding, on operator demand, only an unchanged welding filler wire, comprising:
    (a) a generally elongated cylindrically configured handpiece, including:
        (i) a slender cylindrically elongated electrically insulative straight outer liner having an axially extending straight passageway therethrough;
        (ii) switch means, secured to said outer liner, responsive to finger pressure, for actuating a filler wire advancement means to advance said uncharged welding filler wire through said passageway;
        (iii) an electrically insulative hollow filler wire guide tube extending coaxially from said outer liner, having inner diameter only slightly larger than diameter of welding feed for slideable passage of said welding feed wire therethrough;
        (iv) means for securing said hollow filler wire guide tube to said elongated outer liner;
        (v) means for retaining an end of a flexible conduit within said elongated outer liner at the end thereof remote said filler wire guide tube;
        (vi) minature potentiometer means, secured to said outer liner, responsive to operator finger pressure, for continuously regulating speed of said motor means and resultant rate of filler wire off said reel, through said conduit and said handpiece, at a rate proportional to finger pressure applied by said operator to said minature potentiometer means as said operator grasps said handpiece; wherein said outer liner has an outer diameter of about ⅜ inch to permit said handpiece to be easily held, in the manner of a pencil, in the hand of a normal adult; wherein said handpiece weighs no more than about 5 ounces;
    (b) said filler wire advancement means including;
        (i) a base;
        (ii) a frame mounted on said base;
        (iii) a filler wire reel having filler wire wound therearound, rotatably mounted on said base;
        (iv) motor means, secured to said frame, responsive to finger pressure actuating filler wire through said flexible conduit, said outer liner and said hollow filler wire guide tube seriatim;
        (v) drive wheel means connected to said motor output shaft, rotatable unitarily therewith;
        (vi) idler wheel means movably connected to said frame for biasing said filler wire from said reel against said drive wheel;
        (vii) tensioning spring means connected to a shaft of said idler wheel and to said frame; for biasing said idler wheel towards said drive wheel;
        (viii) a coaxial pair of filler wire alignment tubes connected to said frame, one tube on either side of said idler and drive wheels, of inner diameter greater than diameter of said welding feed wire for slideable passage of said welding feed wire therethrough, positioned along a common axis perpendicular to the direction said tensioning spring biases said idler roller against said drive roller, for passage of said welding feed wire from said reel through a first one of said alignment tubes, between said idler and drive wheels and then through a second one of said alignment tubes seriatim to an end of said flexible conduit remote from said handpiece, to maintain welding filler wire passing therethrough at orientation so said filler wire is biased against said drive wheel by said idler wheel along a direction transverse to the filler wire longitudinal axis; said filler wire advancing to said handpiece via said flexible conduit for passage therethrough of said filler wire;
    (c) said conduit including:
        (i) an inner conduit formed of flexible helically coiled material; and
        (ii) an outer tubular conduit formed of a flexible electrically insulative substantially impereable material.

* * * * *